United States Patent Office 3,423,465
Patented Jan. 21, 1969

3,423,465
SELECTED BIS(PERFLUOROALKYL)KETENES
Sam Andreades and David C. England, Wilmington, Del., assignors to E. I. du Pont de Nemours and Company, Wilmington, Del., a corporation of Delaware
No Drawing. Continuation-in-part of application Ser. No. 283,958, May 29, 1963. This application Mar. 24, 1965, Ser. No. 442,477
U.S. Cl. 260—585.5   3 Claims
Int. Cl. C07c 49/22

ABSTRACT OF THE DISCLOSURE

Described and claimed are bis(perfluoroalkyl)ketenes with up to 8 carbons in the perfluoroalkyl groups prepared by the dehydration of the corresponding $\alpha,\alpha$-diperfluoroalkyl-substituted acetic acid with $P_2O_5$ at 150–500° C. The compounds are useful in rendering cellulosic objects water-repellant.

RELATED APPLICATION

This application is a continuation-in-part of our copending application Ser. No. 283,958, filed May 29, 1963, and now abandoned.

FIELD OF THE INVENTION

This invention relates to, and has as its principal objects provision of, certain new compounds bis(perfluoroalkyl) ketenes, and methods for the preparation of the same.

DESCRIPTION OF THE INVENTION

The new monomers of this invention are characterized by the chemical formula

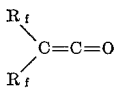

wherein the $R_f$'s are used to represent perfluoroalkyl radicals, alike or different, generally of no more than eight carbons each. An espectially preferred group of these (bis(perfluoroalkyl)ketenes is represented by the following formula:

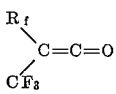

wherein $R_f$ has its previously described meaning.

These new products are prepared most conveniently by the direct pyrolysis in the presence of a chemical dehydrating agent, such as $P_2O_5$ or other strong dehydrating acid anhydrides, of $\alpha,\alpha$-diperfluoroalkyl-substituted acetic acids representable by the structural formula

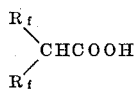

and for the preferred product scope by the said described pyrolysis/dehydration of the $\alpha$-perfluoroalkyl-$\alpha$-trifluoromethylacetic acids of the chemical formula

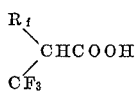

wherein the $R_f$'s have their previously defined meaning.

This pyrolysis/dehydration reaction is effected preferably in the presence of at least molar proportions and conventionally in the presence of excess molar proportions of strong chemical dehydrating agents such as the strong inorganic acid anhydrides, e.g. $P_2O_5$ and the like. The pyrolysis reaction, which can also be regarded possibly more properly chemically as a dehydration reaction, is effected simply by mixing the $\alpha$-hydrobis(perfluoroalkyl)carboxylic acid and the desired excess chemical dehydrating agent, normally with no modifier or chemical reaction media, although such which are chemically inactive under the conditions applied obviously can be used, and heating with or without mixing means at temperatures in the range 150–500° C., preferably 200–350° C., for times of the order of 0.5–12 hours or more while collecting the pyrolyzed or dehydrated product, i.e., the bis(perfluoroalkyl)ketene, in a cold trap connected to the pyrolysis, i.e., reaction, zone. Continuous operations are also operable and are particularly of benefit in those instances wherein the longer chain perfluoroalkyl substituents are involved. In these instances as is conventionally true for such chemical processing conditions, the actual reaction time, i.e., the contact time, for the reactants under the temperature conditions called for will be extremely short, i.e., of the order of a few seconds to at most a few minutes. Normally, and most simply, the reaction will be effected in glass or glass-lined equipment, although other conventional chemical reaction equipment fabricated from materials resistant to and non-reactive with the highly fluorinated intermediates and final products can be used. The isolation of the product will normally be effected simply by providing a collection zone or unit connected integrally with the pyrolysis zone and cooled externally with conventional low-temperature cooling material, most conveniently with, for example, solid carbon dioxide with or without inert heat transfer media, e.g., acetone.

The process conditions necessary for the above generically described dehydration/pyrolysis reaction will vary as a function of the length of the carbon chains of the previously described $R_f$ radicals pendent on the $\alpha$-hydrogen-bearing carbon carrying the carboxylic acid function. Normally speaking, reaction times and temperature conditions for the necessary pyrolysis/dehydration reaction will be in the range 150–500° C. for from 0.5 to 24 hours and most preferably in the range 200–350° C. for reaction times of approximately 2–6 hours. As the carbon chain content of the $R_f$ radicals involved in the bis(perfluoroalkyl)-substituted $\alpha$-hydroacetic acid intermediates, and accordingly in the bis(perfluoroalkyl)ketene final products, increases, it will be preferred to effect the reaction at reduced pressures, e.g., desirably of the order of 50 to 200 mm. of mercury, and also to operate in, generally, the lower temperature range of the previously described reaction conditions, i.e., preferably no greater than 300° C. The reason for this change in preferred reaction conditions is that the longer chain bis(perfluoroalkyl)ketenes are generically higher boiling and accordingly much higher reaction zone temperatures are needed to distill the ketene products from the reaction zone under normal atmospheric conditions. The reaction conditions temperature-wise needed to effect the pyrolysis/dehydration reaction to form these longer chain perfluoroalkyl-ketenes are about the same as those required for the shorter perfluoroalkylketenes, but the higher temperatures necessary to distill the thus formed products from the reaction zone for these longer chain products approaches those levels at which more profound reactions involving the ketene function of the bis(perfluoroalkyl)ketenes can occur. Accordingly, it is preferred to operate at reduced pressures whereby the products can be removed from the reaction zone with appreciably less overall temperature/time exposure.

As described in the foregoing, the bis(perfluoroalkyl)-ketenes of the present invention are obtained directly in a one-step combined pyrolysis/dehydration reaction of the corresponding α,α-di(perfluoroalkyl)-substituted acetic acid intermediates.

These necessary intermediates to the synthesis of the new bis(perfluoroalkyl)ketenes of the present invention, i.e., the bis(perfluoroalkyl)-substituted α-hydroacetic acids, are most simply prepared from the corresponding 2,2-bis(perfluoroalkyl)difluoroethylenes, i.e., using the previously described radical definitions, olefins of the structure

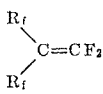

wherein the R_f radicals have their previously defined meaning. This conversion step from the 2,2-bis(perfluoroalkyl)-1,1-difluoroethylenes to the necessary α,α-bis(perfluoroalkyl)-α-hydroacetic acid intermediates can be effected in either or both of two ways. Thus, the 2,2-bis(perfluoroalkyl)-1,1-difluoroethylene can be directly hydrolyzed with water and/or an aqueous acidic solution in a suitable organic solvent carrier such as tetrahydrofuran according to the following stoichiometry:

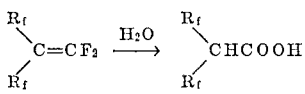

This technique functions best with those compounds wherein the R_f radicals are of relatively short carbon chain content and especially wherein at least one is $CF_3-$.

The necessary α,α-bis(perfluoroalkyl)-α-hydroacetic acid intermediates can also be prepared in a three-stage synthesis which is preferable and in some instances necessary for those compounds wherein the R_f radicals contain a longer carbon chain backbone, e.g., from 3–8 carbons. This 3-stage preparation of the necessary intermediates also starts from the corresponding 2,2-bis(perfluoroalkyl)difluoroethylene intermediates and is properly representable by the following stoichiometry:

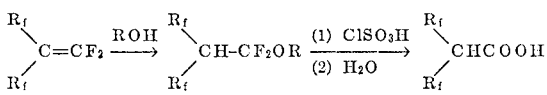

wherein the R_f's have their previously defined meaning and R is used to represent monovalent aliphatically saturated hydrocarbons, i.e., monovalent hydrocarbon radicals free of aliphatic unsaturation but specifically inclusive of aromatic unsaturation.

In the case of the first member of the perfluoroalkyl-ketene series here involved, i.e., bis(trifluoromethyl)-ketene, wherein the R_f's of the preceding formulas for the products as well as the intermediates are both $CF_3-$, there is yet another way of preparing the compound. In essence, this is a compression of the synthesis described in detail in the paragraph before the immediately preceding paragraph which shows the hydrolysis of the 2,2-bis(perfluoroalkyl)difluoroethylenes to the corresponding α,α-bis(perfluoroalkyl)-α-hydroacetic acid intermediates. That synthesis starts with the isolated 2,2-bis(perfluoroalkyl)difluoroethylene. In the case of bis(trifluoromethyl)-ketene, this starting olefin is thus 2,2-bis(trifluoromethyl)difluoroethylene, alternatively referred to as perfluoroisobutene. In this alternative compressed synthesis, chlorodifluoromethane, or, alternatively, tetrafluoroethylene or octafluorocyclobutane, is pyrolyzed at temperatures in the range 600–1000° C., and preferably around 750–850° C., with the pyrolysate off-gases being trapped directly in a hydrolyzing medium such as, for instance, a mixture of water and tetrahydrofuran. The desired perfluoroalkylacetic acid, e.g., α,α-bis(trifluoromethyl)acetic acid, can be obtained from this hydrolyzing medium after passage of the pyrolysate off-gases by distillation, preferably followed by washing the distillate with conc. $H_2SO_4$, and subsequently purified by conventional recrystallization. The same combined pyrolysis/hydrolysis syntheses can also be effected using other terminal perfluoroethylenes such as hexafluoropropylene, but in all instances the product obtained is α,α-bis(trifluoromethyl)acetic acid since, under pyrolyzing conditions, all terminal perfluoroethylenes result in the same (within reasonable analytical ranges) equilibrium mixture of fluoroethylenes and fragmentation products thereof. Due to the availability of the starting materials, terminal perfluoroethylenes of up to 8 carbons are preferred in this pyrolysis.

EMBODIMENTS OF THE INVENTION

This invention is illustrated in greater detail but is not to be limited by the following examples in which the parts given are by weight.

Example I

Part A.—A gas (approximate composition 18% perfluoroisobutene (PFIB) and 82% perfluorocyclobutane) was passed through a cold mixture of tetrahydrofuran and water and then through methanol in a series of three 500-ml. gas-washing bottles cooled in ice baths. In each bottle the gas passed through a sintered-glass disc and then bubbled through the liquid present. Each of the first two bottles contained a mixture of tetrahydrofuran and water (100 ml. of each) and the third bottle contained 200 ml. of methanol. In five hours, 206 l. of gas was scrubbed corresponding to about 1.5 moles of PFIB. The methanol in the third scrubber was mixed with an equal amount of water and the heavy layer distilled to yield 165 g. (0.7 mole) of

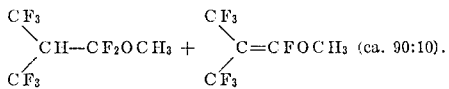

Both of the tetrahydrofuran:water scrubbers contained two phases. They were combined and the lower layer (500 cc.) separated from the upper (200 cc.). To the lower layer was slowly added 500 cc. of conc. $H_2SO_4$ and the mixture continuously extracted with methylene chloride (about 500 cc.) overnight. Distillation of the extract yielded 121 g. (0.62 mole) of α-hydrohexafluoroisobutyric acid, boiling point 90° C./190 mm., which solidified at room temperature. Allowing for the methanol aduct, the yield was 77%. Recrystallized from hexane, the acid melted at 50° C. Knunyants et al., Bull. Acad. Sci., U.S.S.R., Div. Chem. Sci., 1956, 1387, report a melting point of 49.5–50.5° C. When titrated potentiometrically, the $pK_a$ was 2.35 and the neutral equivalent 198 (theory 196).

Part B.—α-Hydrohexafluoroisobutyric acid (196 g.) (one molar proportion) which had been ground in a mortar was mixed well with 284 g. (two molar proportions) of phosphorus pentoxide in a 2-l. one-neck flask with some cooling in a cold water bath. After mixing, the material was spread evenly over the bottom half of the flask. A cold-water condenser with a solid carbon dioxide trap attached was then connected to the flask which was then heated strongly for about four hours at about 200–300° C. Bis(trifluoromethyl)ketene began to collect in the solid carbon dioxide trap. A total of 110 cc. (about 175 g.; impurity 2–3% $POF_3$) was collected. On distillation through a low-temperature still the pure bis(trifluoromethyl)ketene boiled at +5° C.; yield 168 g. (94% of theory).

It was further characterized by its infrared absorption (4.54μ, C=C=O); n-m-r (single peak at −595 c.p.s. from difluorotetrachloroethane at 56.4 mc.); molecular weight by gas density (177.8; theory, 178); analysis: (calc. for $C_4F_6O$: F, 64.04. Found: F, 64.06); and by reaction with water to form α-hydrohexafluoroisobutyric acid, M.P. 50° C.

Part C.—As discussed above, an alternative method for preparing the bis(trifluoromethyl)acetic acid, the socalled "compressed" synthesis, starts with pyrolysis of chlorodifluoromethane, tetrafluoroethylene, or, alternatively, any other terminal perfluoroolefin. A specific preparation follows based on chlorodifluoromethane:

Chlorodifluoromethane ($HClCF_2$) at a rate of 400 ml./min. was passed for one hour at atmospheric pressure into an empty, vertically mounted quartz tube 22" in length and 1" in diameter, heated to 786° maximum temperature in a central 10" section by an electric furnace. A "hot spot" of 800° C. developed in the tube. Gases passing out of the tube were directed through an ice-cooled receiver (500 ml. round-bottom flask) and then bubbled through two gas-scrubbing bottles. The first bottle contained 200 ml. water and the second contained a mixture of 100 ml. water and 100 ml. of tetrahydrofuran. About 10 ml. of dark oil collected in the ice-cooled receiver. The water bottle was acidic (HCl) and contained 1.6 g. of suspended low-molecular weight polytetrafluoroethylene. The second bottle contained two layers. The lower layer (ca. 50 ml.) was washed once with an equal amount of water, dried, and distilled. There was recovered 1.2 g. of liquid, B.P. 65–70° C./30 mm. This material was washed with 5 ml. of conc. sulfuric acid and crystalline $(CF_3)_2CHCOOH$ separated. It was extracted with methylene chloride and characterized by mixed melting point with a known sample (M.P. 49–50° C.) and by infrared absorption compared with that of the known sample.

When reacted in essentially the same manner as described in Parts A and B of the foregoing detailed exemplary disclosure, the following intermediates will produce the following numerated new bis(perfluoroalkyl) ketenes of the present invention. Thus, on acid hydrolysis of 7 - difluoromethylenehexacosafluorotridecane, there will be obtained bis(tridecafluorohexyl) - α - hydroacetic acid, i.e., hexacosafluoro - 7 - tridecanecarboxylic acid, which on pyrolysis/dehydration will form bis(tridecafluorohexyl)ketene. In a similar fashion, hydrolysis of 2-trifluoromethylperfluorobutene will result in the formation of pentafluoroethyltrifluoromethylacetic acid, i.e., 2H-perfluorobutanecarboxylic acid, from which by pyrolysis/dehydration as previously described, there will be obtained pentafluoroethyltrifluoromethylketene. Similarly, from 2-difluoromethylenedecafluoro-n-pentane, there will be obtained α-trifluoromethyl-α-heptafluoro-n-propylacetic acid, from which by pyrolysis/dehydration there will be obtained trifluoromethylheptafluoro-n-propylketene. Similarly, from 2-difluoromethylenedodecafluorohexane, there will be obtained nonafluorobutyltrifluoromethylacetic acid, i.e., 2-dodecafluorohexanecarboxylic acid, from which on pyrolysis/dehydration there will be obtained nonafluorobutyltrifluoromethylketene. Similarly, from 2,2-bis(pentafluoroethyl)-1,1-difluoroethylene, there will be obtained bis(pentafluoroethyl)acetic acid, i.e., decafluoropentane-3-carboxylic acid, from which there will be obtained bis(pentafluoroethyl)ketene. Similarly, from 2 - trifluoromethyl-2-heptadecafluoro - n - octyl - 1,1 - difluoroethylene, there will be obtained α-trifluoromethyl-α-heptadecafluoro-n-octylacetic acid, i.e., eicosafluoro-2-n-decanecarboxylic acid, from which there will be obtained trifluoromethylheptadeca-n-octylketene. Similarly, from 2,2-bis(heptadecafluoro-n-octyl)-1,1 - difluoroethylene, there will be obtained α,α-bis(heptadecafluoro-n - octyl)acetic acid, i.e., tetratriacontafluoro - 9 - heptadecanecarboxylic acid, from which there will be obtained bis(heptadecafluoro-n-octyl)ketene.

The products of this invention are useful as agents capable of rendering shaped cellulosic objects, such as paper, fabric, and the like, water-repellent. To illustrate specifically, strips of conventional analytical filter paper and cotton fabric were placed in closed glass vessels fitted with pumping means. The internal volume of these reactors was pumped down to reduce the pressure and the reactors were heated externally at steam bath temperatures for 30 minutes to assure that the paper and fabric samples were completely dry. Gaseous bis(trifluoromethyl)ketene was then bled into the reaction zone until an internal pressure equivalent to atmospheric pressure was reached. The samples in the reactors with the input bis(trifluoromethyl)ketene were then allowed to stand at room temperature for 60 hours. The reactors were then opened and the treated paper and fabric samples removed. These were placed on a flat surface and a drop of water placed on the surface of the treated samples. The water drops remained standing on the surface of both the treated paper and fabric samples without penetrating for a period of several hours and ultimately the water drops evaporated. In contrast, drops similarly placed on the surface of untreated control samples of filter paper and cotton fabric, also standing on a flat surface, were immediately absorbed, i.e., the untreated paper and fabric materials were highly water absorbent. The water repellency conferred on the treated paper and fabric samples by virtue of reaction with the bis(trifluoromethyl)ketene was retained even after the treated samples were boiled for a short time in water and dried.

In contrast to this excellent surface water-proofing behavior thus exhibited by the bis(perfluoroalkyl)ketenes on shaped, cellulosic-based objects, sheets of paper and strips of cotton fabric similarly treated with the somewhat analogous bis(trifluoromethyl)thioketene of Raasch U.S. Patent 3,275,609 exhibited no change versus control samples with respect to the surface behavior toward liquid water, i.e., the samples treated with the bis(trifluoromethyl)thioketene were comparably highly absorbent of liquid water with untreated controls.

The oxo products of the present invention are suprisingly stable when compared with the somewhat analogous, from chemical structure considerations, bis(trifluoromethyl)thioketene of the above-mentioned patent. Thus, when an about one-part portion of the bis(trifluoromethyl)thioketene was placed in a glass reactor and about 5% of triethylamine was added thereto, the bis(trifluoromethyl)thioketene immediately became hot and the reaction mixture darkened and fumed. On cooling, the reaction mixture solidified to an essentially quantitative yield of the crystalline bis(trifluoromethyl)thioketene dimer.

In contrast, a drop of triethylamine was placed in a glass n-m-r analysis tube and about 2 ccs. of bis(trifluoromethyl)ketene was condensed on it at liquid nitrogen temperatures. The tube was then sealed and allowed to come to room temperature. The drop of triethylamine became deep yellow on standing but remained immiscible with the bis(triflouromethyl)ketene. Examination of the tube contents by n-m-r techniques showed the material to be essentially all unchanged monomeric bis(trifluoromethyl)ketene.

The failure of the present bis(perfluoroalkyl)ketenes to dimerize under conventional conditions is especially unusual and serves to point up the completely unpredictable properties exhibited by these bis(perfluoroalkyl)ketenes, not only when compared with the somewhat analogous bis(trifluoromethyl)thioketene of the above-identified patent of Raasch, but also in the competely generic sense when compared with all other known ketenes. Thus, insofar as those skilled in the ketene art are connected, ketenes generically dimerize. The following statement is quoted in support of this point from the recognized definitive literature review on ketenes and the chemistry thereof appearing in vol. III of "Organic Reactions" in the section headed "Preparation of Ketenes and Ketene Dimers" by Hanford and Sauer at page 127, John Wiley & Sons, N.Y., 1946:

"All known ketenes dimerize when heated or allowed to stand at room temperature or below for a sufficient length of time."

In contrast to this art-expected property and in addition to the above-delineated behavior of bis(trifluoromethyl) ketene, and in contrast to bis(trifluoromethyl)thioketene and likewise other known ketenes upon exposure to known dimerization conditions, bis(trifluoromethyl)ketene is recovered completed unchanged after heating for as long as eight hours at 250° C. in a sealed neutral nonbasic glass reactor.

Since obvious modifications and equivalents in the invention will be evident to those skilled in the chemical arts, we propose to be bound solely by the appended claims.

The embodiments of the invention in which an exclusive property or privilege is claimed are defined as follows:

1. Bis(perfluoroalkyl)ketenes wherein the perfluoroalkyl groups are of up to 8 carbons.
2. Trifluoromethylperfluoroalkylketenes wherein the perfluoroalkyl group is of up to 8 carbons.
3. Bis(trifluoromethyl)ketene.

References Cited
UNITED STATES PATENTS
1,735,962 11/1929 Dreyfus _____ 260—585.5
1,883,353 10/1932 Dreyfus _____ 260—585.5
2,278,537 4/1942 Dreyfus et al. _____ 260—585.5

OTHER REFERENCES
Knunyants et al., "Chem. Abst.," vol. 51, col. 8037f (1957) QD1.A51.

Moeller, "Inorganic Chem.," page 646 (1952) QD151.M65.

Cheburkov et al., "Chem. Abst.," vol. 59, col. 15175f (1963) QD11.A51.

Clark et al., "J. Am. Chem. Soc.," vol. 75, pp. 6305–6 (1955) QD1.A5.

LEON ZITVER, *Primary Examiner.*

M. JACOB, *Assistant Examiner.*

U.S. Cl. X.R.

260—260, 539, 614; 117—152, 139.5